Oct. 3, 1939. H. K. STEEN Re. 21,228
SHOPPING BAG
Original Filed July 27, 1935 2 Sheets-Sheet 1
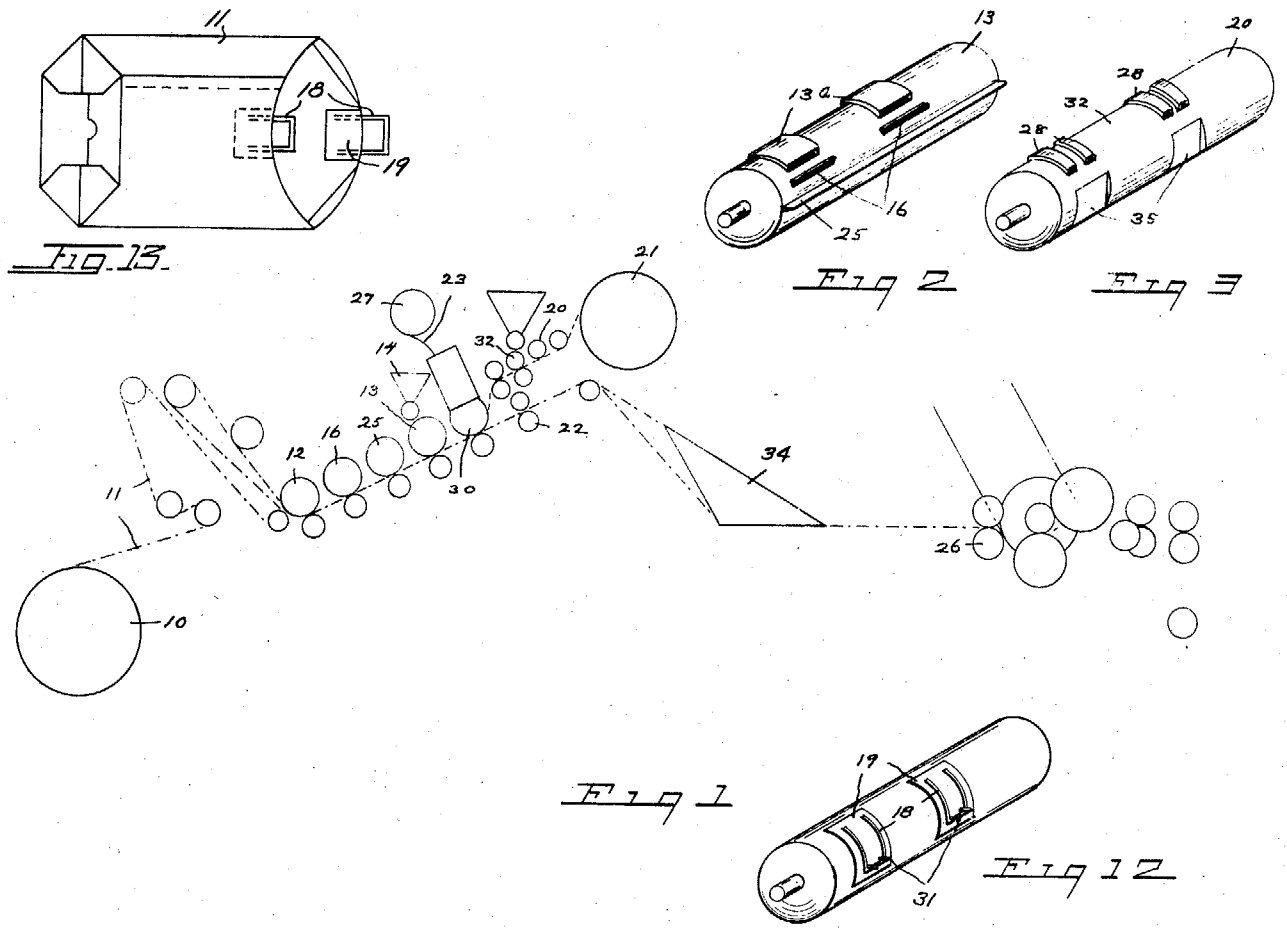
INVENTOR
BY Harford K. Steen
Geo. Berry
ATTORNEY Oct. 3, 1939. H. K. STEEN Re. 21,228

SHOPPING BAG

Original Filed July 27, 1935 2 Sheets-Sheet 2

INVENTOR
Harford K. Steen
BY
G. W. Berry
ATTORNEY

Reissued Oct. 3, 1939

Re. 21,228

UNITED STATES PATENT OFFICE 21,228

SHOPPING BAG

Harford K. Steen, Newburgh, N. Y.

Original No. 2,076,680, dated April 13, 1937, Serial No. 33,553, July 27, 1935. Application for reissue April 10, 1939, Serial No. 267,177

6 Claims. (Cl. 229—54)

This invention relates to shopping bags made of paper or other suitable material and to the method employed in their manufacture, and constitutes an improvement over that described and claimed in United States Patent No. 1,799,072 which was issued to me on March 31, 1931, for a Method of manufacturing shopping bags.

In the above referred to patent, the cord handles were secured to the inside of the bag by an adhesive and a reinforcing strip that extended the entire length of the bag web, from which the tube and bag were formed, and to provide for the extension or projection of the proper portion of the handles to form a grip beyond the upper or open end of the finished bag, the end of the bag was cut or slotted down for a portion of the length of the handle and was then folded over along a crease which was formed in the making so that this fold could be either pasted to the inside of the bag or left loose to form a flap which could be folded to partly close the bag.

But it has been found that this method of manufacture not only consumes time and uses a greater amount of both the bag stock and the reinforcing material than is necessary, but does not provide such a pleasing appearance or as serviceable a bag as one where the handle projects from an even single thickness of bag material.

To facilitate the bundling or packing of the folded bags in bales for shipment and to prevent the stacked handles from building up in thickness thus taking too much room in the bale, and to give a closer formation aiding greatly in the manufacture, especially when a bottomer is used as the stacks of bags in the machine do not have to be replenished so often, I have nested the handles.

Also by the nesting of the handles, parts of the machine through or over which the attached handles have to pass, do not have to be relieved so much thus eliminating the possibility to creep and the machine will thus operate to better advantage.

While I have shown and described these handles as being attached to the bag by gummed patches, it is to be understood that they may be attached by other suitable means, such as staples or tied through holes formed in the web.

For this purpose I have added to my above mentioned patent the idea of locating the attached handles to the web in such positions that when the bags are folded, the handles will be nested one within the other so that they will lie side by side and only occupy the thickness of one single handle in the stacking of the bags, thus saving over 40 per cent. of the storage and shipping space required for the same number of bags that were made in the old manner.

Another object of the invention is to provide a bag in which the cord handles are secured to the interior thereof by an adhesive applied to predetermined local surfaces on the web and adapted to receive patches which have received the handles and which are both secured to the web by the adhesive or other suitable means, to form a firm and strong junction.

Another object of the invention is to provide a bag in which the cord handles extend beyond the open end of the bag without having to have the end of the bag folded over or formed with a flap.

Another object of the invention is to provide a bag in which the cord handles are so located and attached that when the bag is folded, the handles will nest one within the other to present a single thickness of handle and prevent building up when baled.

With these and other objects in view, my invention consists in certain novel construction and combination of parts as will hereinafter be fully described in the following description and illustrated in the accompanying drawings which form a part hereof and in which like figures of reference refer to corresponding parts in all of the views, and it is understood that slight changes may be made without departing from the spirit of the invention.

In the drawings:

Figure 1 is a diagrammatic view showing the steps of my process.

Figure 2 is a detail view of the pasting, slitting and creasing roller.

Figure 3 is a detail view of the patch moistening or pasting roller.

Figure 12 shows the handle and paste attaching means.

Figure 13 is a view of the bag showing the end open.

Figures 4, 5, 6, 7:
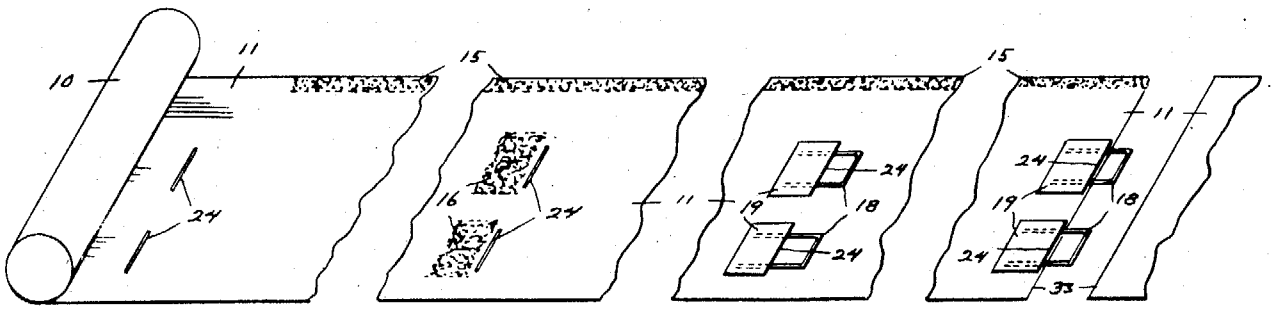
Figure 4 shows the web after the slits have been made and the seaming paste applied.
Figure 5 shows the web after the paste or adhesive has been applied adjacent to the slits for holding the patches and handles.
Figure 6 shows the web after the patches and handles have been secured in place.
Figure 7 shows the web with the extending handles after the bag portion or length is cut from the stock, but without having been tubed. In practice the tubing is done before the bag length is severed from the web.

In carrying out my invention the mechanism required for the various steps and operations may be constructed in a single machine, or as a part of a bag making machine of the usual type, or the bags may be taken from my apparatus when in the form of a tube and bottomed and folded in another machine if desired, and in the description and illustrations of this present invention I have embodied my invention in a bag making machine without the bottoming and folding means.

Referring to the drawings:

I have taken the usual bag making machine and incorporated therein the required mechanism for making and attaching the handles and severing the bag tube from the web at the proper location to provide a bag length.

The usual stock roll 10 of suitable bag making material, such as paper or other fabric, is indicated and from this is drawn the web from which the bag is formed, and this web 11 during its travel through the machine is indicated by the broken lines.

From the stock roll 10 the web travels past the seam pasting rolls 12 where paste is applied to one edge 15 to later on hold the web in the form of a tube, and the web next travels past the knife 16 where the two aligned slits 24, which locate the position of the handles 18 are made, and if it is desired to form the bag with a flap 17, a crease 26 is now placed in the web by the creaser 25, and from either the slitting knives 16 or the creaser 25 the web is carried past the adhesive pads 13 which transfer adhesive from the pot 14 to predetermined local surfaces 16 on the web adjacent to the slits 24 for the reception of the handles 18 and patches 19.

While this is taking place, a pair of cord handles 18 and their attaching patches 19 are being prepared as follows: A piece of cord 23 is drawn from the stock roll 27; cut off and formed into the D-shaped handles 18. From a roll 21 of strip stock, either plain or gummed, a strip is fed and from this are cut the patches 19 by the knife bearing roll 20, and these patches are carried past the pads 28 on the roller 32, which applies either moisture or gum to the patches in two parallel strips 29 on their surface.

The transfer roller 30 that carries these patches 19 and transfers them to the web 11, is provided with the pins 31 which perforate the patches 19 and carry them along as well as the formed handles 18 upon the patches in the moist gum and in contact with the pins 31.

As the traveling web 11 reaches the proper station in the machine the transfer roller 30 places the gummed patches 19 and the handles 18 upon the previously gummed local surfaces 16 on the web, which is then carried through the press rollers 22 that press the patches 19 and handles 18 upon the web 11 to form a firm and strong union.

From the handle pressing roller 22, the web 11 is carried to the usual tube forming device 34 which brings together the edges of the web 11 which are retained by the paste seam 15.

After the bag tube has been formed, it is severed from the web 11 by the action of the cut-off knife roll 26 which makes a transverse cut 33 in aligned relation with the slits 24 if the bag is to be made without a flap 17.

But should it be desired to form the bag with the flap 17, then when the original slits 24 are made, additional slits are made at right angles thereto in line with the body of the handles 18, or these longitudinal slits may be made without the transverse slits; the web 11 creases at the proper location to form the flap 17, the crease 26 acting as a guide in folding the flap 17.

The bag tube is now taken to the bottoming device where the bottom is formed, and the bags are then folded and baled.

The paste or adhesive rolls, 12, 13, and 20 are of the usual type having raised pads **13*a* and 28, respectively, for transferring the paste from the pot to the web 11, and are provided with the cut-out portions 35**.

The machine for making the handled shopping bag is described in somewhat greater detail and is claimed in my Patent No. 2,060,450 issued November 10, 1936, whereas the method is more fully described and is claimed in my Patent No. 2,060,451 of November 10, 1936.

Figures 8, 9:
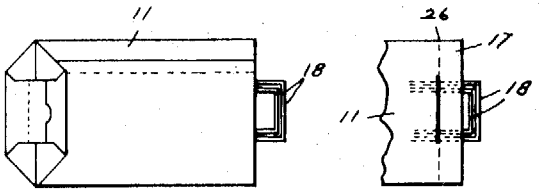
Figure 8 shows the finished folded bag.
Figure 9 shows a finished bag with a flap.
Figures 10, 11:
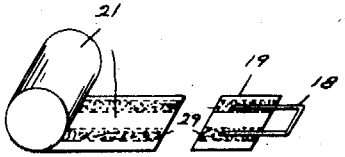
Figure 10 shows the stock roll of patch making strip with its two rows of adhesive.
Figure 11 shows a patch having been cut off and the formed handle placed thereon ready for application to the web.

To provide for the folded bag not building up in thickness in the bale due to the handles 18 stacking one upon the other, I have formed the two handles of slightly different dimensions, and have located them both upon the patches and upon the web, so that they will lie one within the other or nested, so that they take up but a single thickness of cord when the bag is folded upon itself. In the embodiment shown, the handles are formed from stock cord of suitable material, either of single or multiple ribbon, twisted or braided and with or without a reinforcing wire. As will be evident, the twisted or braided material has sufficient rigidity to assume and maintain the form of handle shown in Figure 8, for example, thereby insuring that the individual bags when stacked do not present more than a single thickness of cord material.

Having thus described my invention, what I claim as new and desire to secure by Letters Patent, is:

1. As an article of manufacture, a shopping bag comprising a body portion, a pair of patches of suitable reinforcing material secured to the inner surface of said body portion adjacent the open end thereof, handles of different width interposed between the patches and the inner surface of the body portion with their gripping portions projecting from the open end of the bag, and nesting one within the other when the bag is folded.

2. As an article of manufacture, a shopping bag comprising a body portion having an open end and a closed end and adapted to be folded when not in use, patches of reinforcing material secured to the inner surface of said bag body adjacent to the open end, handles of different width interposed between said patches and the bag and secured thereto with their grip portions extending from the open end of the bag and adapted to nest with each other to form a single thickness of handle when the bag is in a folded state.

3. As an article of manufacture, a handled shopping bag comprising a body having an open end and a closed end and adapted to be folded flat forming two sides, patches secured to said sides adjacent the open end, handles formed with grips and different width body portions, said body portions of the handles interposed between the patches and the bag and secured to both with the grip portions extending from the open end of the bag, and nesting one within the other when the bag is folded.

4. As an article of manufacture, a shopping bag comprising a bag body having an open end and a closed end, said open end formed with transverse slits and aligned creases, handles of different width secured to said bag body and nesting one within the other adjacent to said slits and said creases and extending from the open end of the bag body when the bag is folded, that portion of the bag body between the slits and crease and open end comprising a flap.

5. As an article of manufacture, a shopping bag having handles disposed on opposite sides of the bag together with means for securing same thereto, said handles having their gripping portions projecting from the open end of the bag, one of said handles being slightly smaller and entirely disposed and nested within the other when the bag is folded flat, whereby when folded flat and stacked the folded bag presents a single handle thickness.

6. As an article of manufactuse, a shopping bag having cord handles disposed on opposite sides of the bag together with means for securing same thereto, said handles having their gripping portions projecting from the open end of the bag, one of said handles being slightly smaller and entirely disposed and nested within the other when the bag is folded flat, whereby when folded flat and stacked the folded bag presents a single handle thickness.

HARFORD K. STEEN.